No. 721,595. PATENTED FEB. 24, 1903.
T. W. MORAN.
PIPE JOINT AND VALVE IN CONNECTION THEREWITH.
APPLICATION FILED JAN. 4, 1902.
NO MODEL. 2 SHEETS—SHEET 1.
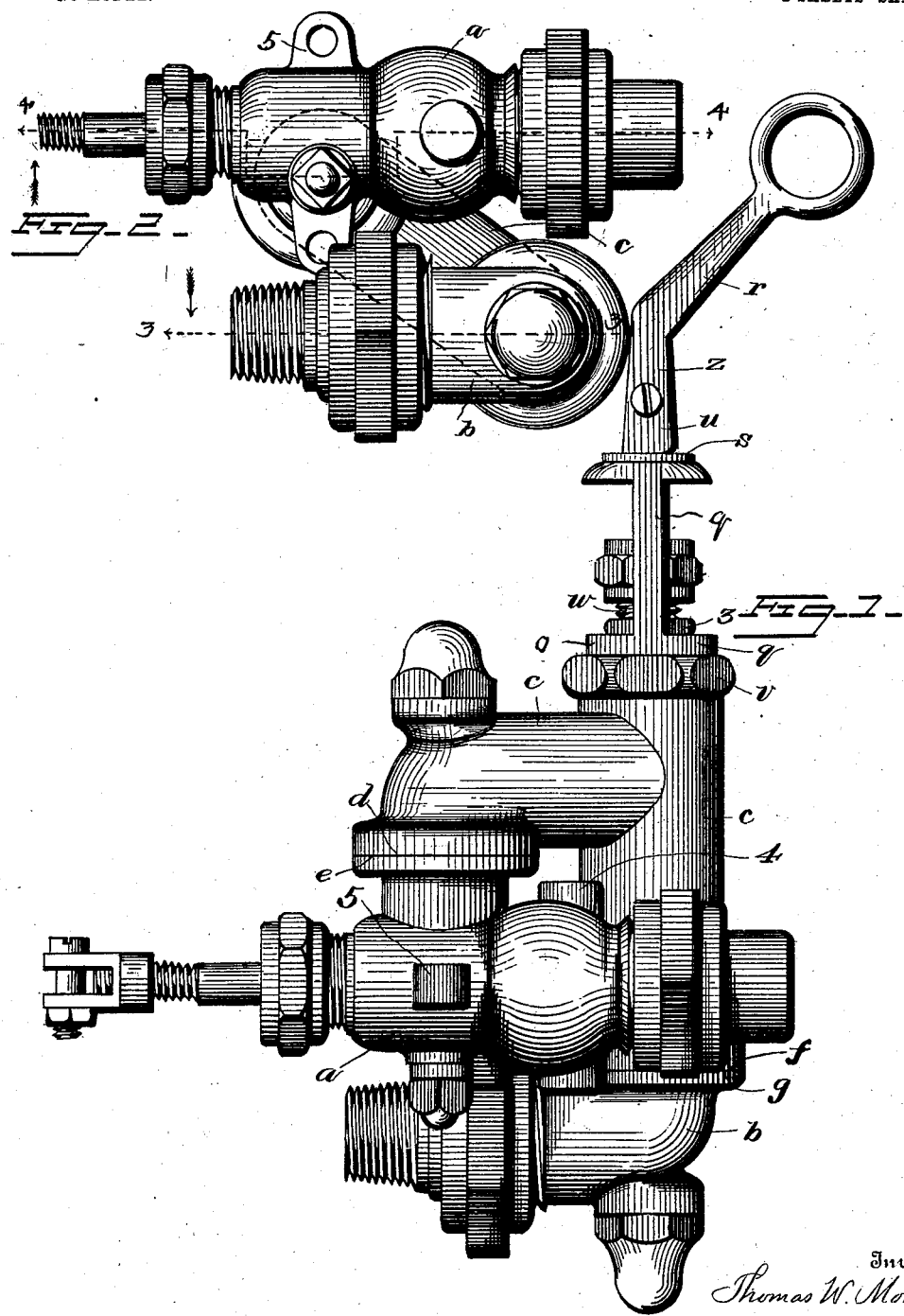
Witnesses
F. A. Boswell.
George M. Anderson.
Inventor
Thomas W. Moran
By E. W. Anderson
his Attorney

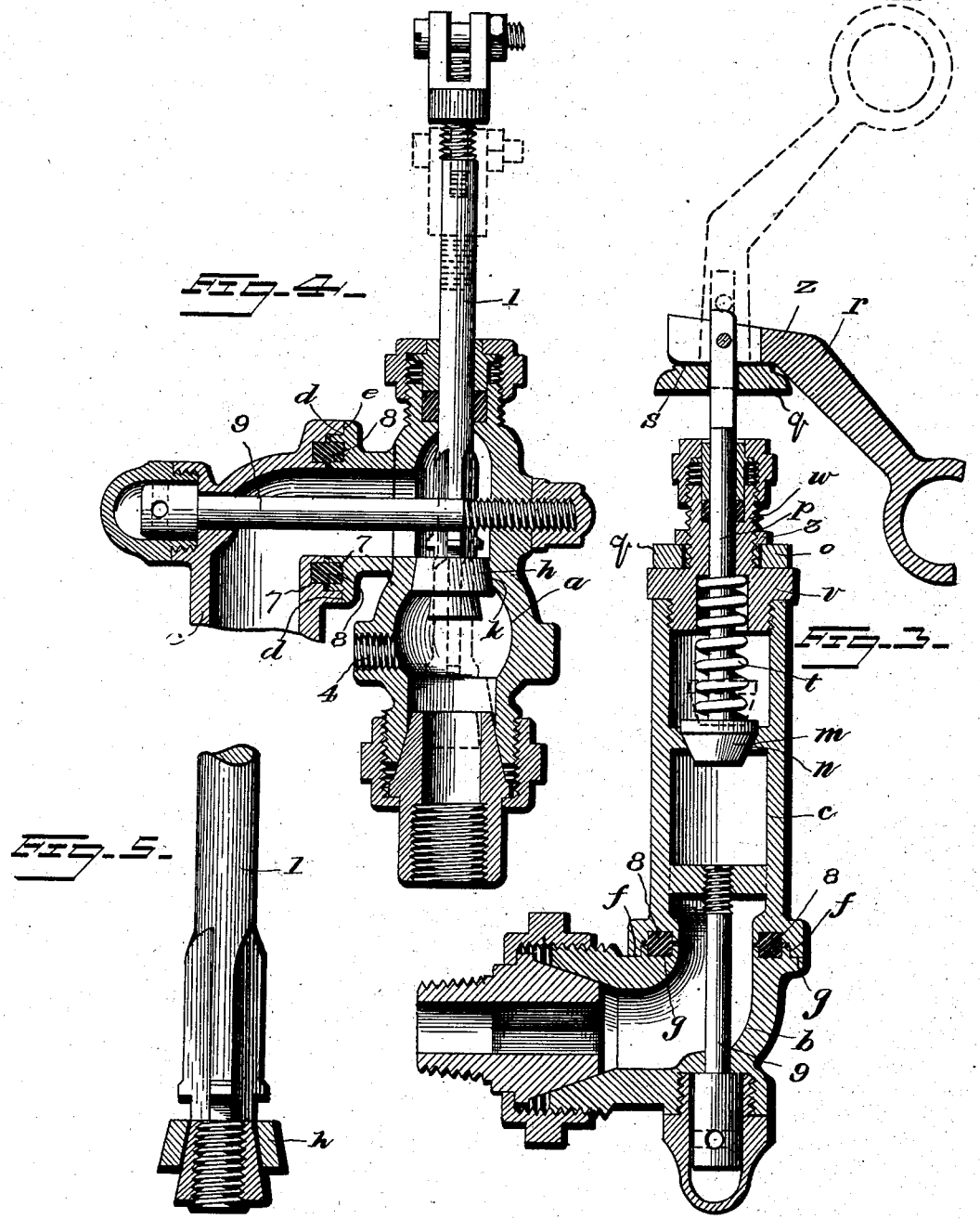

United States Patent Office.

THOMAS W. MORAN, OF LOUISVILLE, KENTUCKY, ASSIGNOR TO MORAN FLEXIBLE STEAM JOINT COMPANY, OF LOUISVILLE, KENTUCKY, A CORPORATION OF KENTUCKY.

PIPE-JOINT AND VALVE IN CONNECTION THEREWITH.

SPECIFICATION forming part of Letters Patent No. 721,595, dated February 24, 1903.

Application filed January 4, 1902. Serial No. 88,390. (No model.)

*To all whom it may concern:*

Be it known that I, THOMAS W. MORAN, a citizen of the United States, and a resident of Louisville, in the county of Jefferson and State of Kentucky, have made a certain new and useful Invention in Pipe-Joints and Valves in Connection Therewith; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a plan view of the valve-joint, the lever $r$ being shown as raised and the auxiliary valve being open. Fig. 2 is a side elevation of the same. Fig. 3 is a section on the line 3 3, Fig. 2. Fig. 4 is a section on the line 4 4, Fig. 2. Fig. 5 is a detail view, partly in section, of the valve $h$.

The invention relates to flexible-joint valve connections between the boiler and engine of steam-propelled vehicles, especially of the automobile type, wherein the pipe connections from the boiler and to the engine are, as a rule, at right angles to each other; and the invention consists in the novel construction and combinations of parts, as hereinafter set forth.

In the accompanying drawings, illustrating the invention, the letter $a$ designates the induction-section of the joint, which is connected to the boiler-pipe, and $b$ the eduction-section of the joint, which is connected to the steam-pipe of the engine. These sections $a$ and $b$ have their axes in closely-related parallel planes, so that they can be placed at right angles to each other, or nearly so, as in the usual arrangement of the piping is required.

Between the section $a$ and the section $b$ is the intermediate or swivel section $c$, having the joint-face $d$, which engages the joint-face $e$ of the section $a$ and parallel thereto, the joint-face $f$, which engages the joint-face $g$ of the section $b$, the joint-faces $d$ and $f$ being turned in the same direction in such wise as to bring the section $b$ under section $a$ when the joint is connected up in position. All these joint-faces are therefore in planes at right angles to the axis of the swivel-section $c$ and parallel to the axis of the sections $a$ and $b$.

In the section $a$ are located the main throttle-valve $h$ and valve-seat $k$, the valve-stem projecting, as indicated at $l$, axially from this section. The auxiliary throttle-valve $m$ and valve-seat $n$ are located in the swivel-section, the valve-stem $p$ projecting axially from this section through an axially-pivoted frame $q$ and being provided at its end with a trip cam-lever $r$, which is pivoted to the end of the stem $p$ and engages the outer face or bearing $s$ of the frame $q$.

A spring $t$ within the section is provided to force the valve $m$ against its seat when the cam-lever is turned to permit such action. When the cam-lever is turned outward, however, its elongated cam portion $z$ is turned in the direction of the axis of the valve-stem, bringing the rounded end of its bearing-arm $u$ into engagement with the bearing-face of the frame and forcibly moving the valve from its seat against the spring tension. In this position it is held by the engagement of the end of the cam with the frame-bearing and the valve is maintained in open position, as is required during the operation of the mechanism. When, however, the valve is tripped by moving the end of the lever slightly, the latter is thrown so that its cam is brought lengthwise against the frame-bearing and the valve is forced against its seat, shutting off the steam. These actions are performed with facility, and the movements of the cam and valve are practically instantaneous, especially as regards the action in shutting off the steam.

The intermediate or swivel section $c$ or auxiliary-valve chamber is closed at the end opposite the bearing-face with a screw-plug $v$, which is provided with an externally-threaded projection $w$ on its outer face, which is bored to form the bearing for the stem $p$ of the auxiliary valve and serves for the connection of the stuffing-box. The inner bearing-disk o of the frame q is pivoted on this projection and moves easily between the head of the screw-plug and a threaded collar 3 on the projection.

A threaded aperture or tap 4 is provided in the wall of the section a for the attachment of a safety-valve.

On the top of the upper section a is provided a lug 5, which is designed to be connected to the carriage-frame, the latter being provided with a pivot-bolt for the purpose. The joint in this manner is arranged to have a swinging action or adjustment, which in connection with its flexible nature materially facilitates its attachment to the pipes, which may be of varying length and position, and in addition has a compensating action designed to counteract the wearing effect of the vibrations and joltings of the vehicle. The springs should be made of phosphor-bronze.

The annular recessed bearings 7 of the joint-faces whereby the sections a and b engage the intermediate auxiliary-valve section c are usually of stepped construction, as shown in cross-section, being so formed in order to qualify them for use when properly lubricated and tightened up in holding air, steam, or water. The gaskets are indicated at 8 and are of annular form, fitting partially in the annular recess of one joint-face and partially in the recess of the other joint-face.

The sections a and b are held to the intermediate section c by means of the axial pivot-bolts 9 9, which are parallel to each other. Unions may be provided at the end of section a and of section b to facilitate their attachment to the piping.

Having described this invention, what I claim, and desire to secure by Letters Patent, is—

1. In a flexible-joint valve connection for pipes, the combination with the induction-section, of the eduction-section, the intermediate pivotal auxiliary-valve section, its spring-actuated valve and trip-lever, substantially as specified.

2. In a flexible-joint valve connection for pipes, the combination with the swing induction-section, and the eduction-section, of the intermediate auxiliary-valve section, pivotally connected to said induction and eduction sections by parallel bolts, its spring-actuated valve, and trip cam-lever, substantially as specified.

3. In a flexible-joint valve connection for pipes, the combination with the induction-section, and the eduction-section, of the intermediate auxiliary-valve section, pivotally engaging said induction and eduction sections by annularly-recessed joint-faces, and connected to said sections by parallel bolts, the spring-actuated auxiliary valve, and trip-lever, substantially as specified.

4. In a flexible-joint valve connection for pipes, the combination with the induction and eduction sections of the pivoted intermediate auxiliary-valve section, its spring-actuated valve and stem, trip-lever and pivoted bearing-frame for said stem, substantially as specified.

5. A swinging flexible-joint valve connection for pipes, having an auxiliary-valve section, spring-actuated valve and stem, stem-bearing frame, and trip cam-lever, substantially as specified.

6. A swinging flexible-joint valve connection for pipes, having the auxiliary-valve section axially at right angles to the planes of the axis of the induction and eduction sections, said sections being pivotally connected to said auxiliary-valve section by parallel bolts, substantially as specified.

In testimony whereof I affix my signature in presence of two witnesses.

THOMAS W. MORAN.

Witnesses:
E. A. SUTTON,
S. G. DARDGEY.